(No Model.)
S. MALES.
REMEDY FOR CATARRH, &c.
No. 398,839. Patented Mar. 5, 1889.
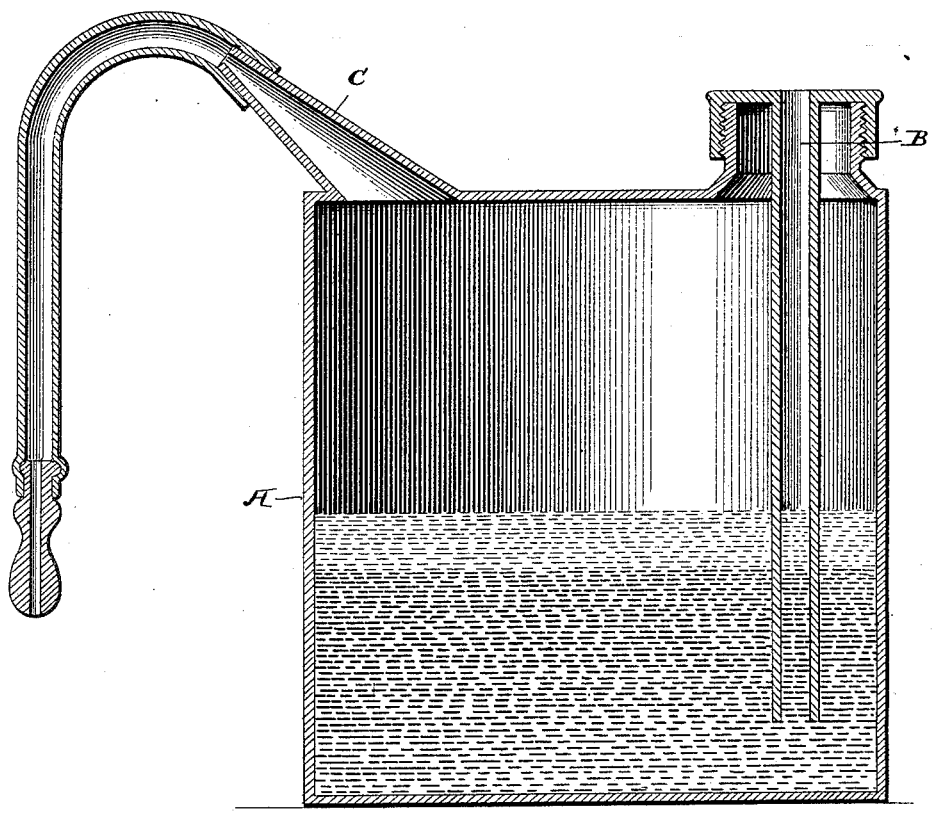
Witnesses.
Inventor,
S. Males
Foster Freeman
Attorney

UNITED STATES PATENT OFFICE.

SAMUEL MALES, OF WINTON PLACE, OHIO.

REMEDY FOR CATARRH, &c.

SPECIFICATION forming part of Letters Patent No. 398,839, dated March 5, 1889.

Application filed October 6, 1887. Serial No. 251,574. (No specimens.)

*To all whom it may concern:*

Be it known that I, SAMUEL MALES, a citizen of the United States, residing at Winton Place, in the county of Hamilton and State of Ohio, have invented certain new and useful Improvements in Remedies for Catarrh, &c., of which the following is a description.

The compound is adapted for the treatment of throat and lung complaints, particularly consumption, catarrh, and bronchitis.

The mixture consists of tar, preferably that obtained from the long-leafed pine, (*Pinus Americanus*,) balsam of fir free from turpentine, and with these is mingled the oil of Norway spruce. The object of the oil of Norway spruce is to render the mixture more fluid, and also to impart to it a more exhilarating and healing effect. Instead of the oil of Norway spruce, the oil of hemlock may be used; or both of these oils may be put into the combination. The essential element of the mixture is the tar. The compound thus prepared is placed in a suitable containing-vessel and is then subjected to gentle heat, when the vapors produced may be inhaled.

The accompanying drawing represents a central vertical section of the preferred form of inhaler.

My preferred form of inhaler (shown in the drawing) consists of a closed vessel, A, provided with means for filling it, and having a tube, B, communicating with the atmosphere and extending down toward the bottom of the vessel. A second tube, C, with which is connected a mouth-piece, communicates with the interior of the vessel A at the top, but does not extend down into the vessel. In use this inhaler is filled about one-third full of water, solution of chlorate of potash, or weak potash-lye, or tar-water, or a decoction made from the boughs of the spruce or hemlock. On top of this a thin layer of the compound is floated, and the whole is then subjected to gentle heat. By inhaling through the tube C air is drawn down through tube B, bubbles up through the warm compound, and carries the medicated vapors with it to the lungs. The proportions of the compound are preferably four of tar, one of the balsam of fir, and one of the oil of hemlock or spruce, as the case may be; but these proportions may be varied more or less, according to the strength desired. The vapors so inhaled have a curative effect in consumption, catarrh, and other diseases of the throat and lungs.

What I claim as new, and desire to secure by Letters Patent, is—

A medical compound consisting of a mixture of tar, balsam of fir, and an oil, as oil of hemlock, substantially in the proportions named, together with an alkaline solution, substantially as described.

SAMUEL MALES.

Attest:
W. S. CHRISTOPHER,
W. P. GULICK.